3,687,643
BRAKE OR CLUTCH LINING
Michel Eudier, 3 Rue Andrieux,
Paris, France
Filed May 5, 1970, Ser. No. 34,658
Claims priority, application France, May 23, 1969,
6916869
Int. Cl. B22f 1/00
U.S. Cl. 29—182.2        10 Claims

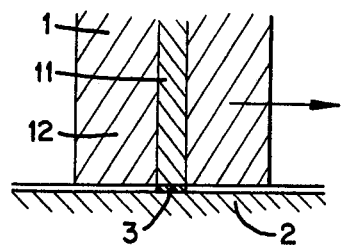
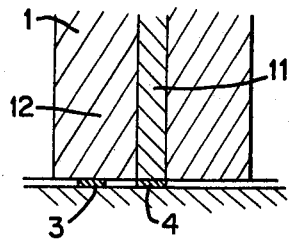
FIG.1a  FIG.1b
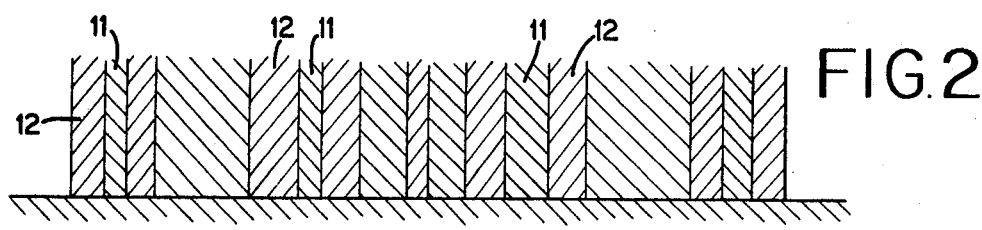
FIG.2
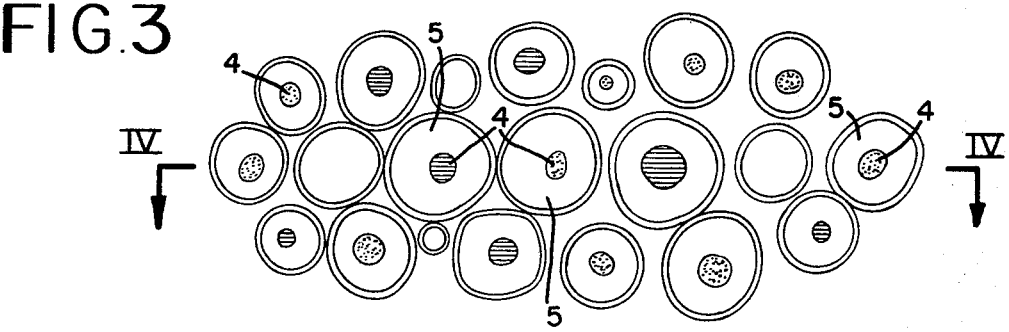
FIG.3
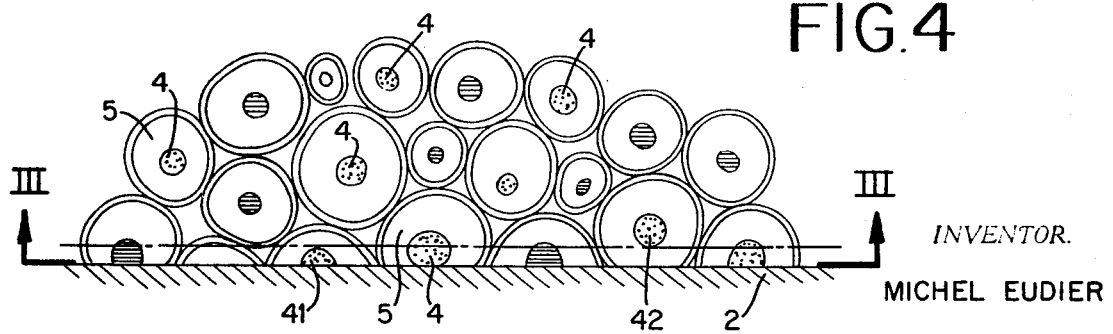
FIG.4
INVENTOR.
MICHEL EUDIER

United States Patent Office 3,687,643
Patented Aug. 29, 1972

ABSTRACT OF THE DISCLOSURE

A brake lining formed of elements having a nucleus of grains or wires weldable to a friction surface. The nucleus being surrounded by a material which will not weld with the surface, and the elements are sintered together.

---

The invention relates to a brake or clutch lining.

Disc or drum brakes, or clutches comprise a shoe adapted to be applied via a lining against a frictional surface. The lining can be composed of a mixture of asbestos, pitch and copper wire, or it can be produced by sintering a powder of siliceous or graphitic iron.

When the brake is applied or the clutch engaged, the resulting friction heats the linings to elevated temperatures which limit the intensity and duration of the permissible braking or clutch-engaging force. Moreover, the frictional coefficient varies in dependence on the temperature which the lining reaches. In sintered linings the iron particles may also become welded to the frictional surface, then be sheared, so that the metal is torn off and the frictional surface quickly becomes damaged.

To obviate these disadvantages the invention provides a brake or clutch lining which is obtained by the sintering of granular material and can stand up to a considerable rise in temperature, and whose efficiency is substantially independent of temperature.

According to the invention at least a portion of the granular material is formed by grains each composed by a metal nucleus which is adapted to be welded by friction to the metal of the frictional surface and is enclosed by a layer of a metal product which is harder than the nucleus and cannot be welded by friction to the metal of the frictional surface.

Exemplary embodiments of the invention will now be described in greater detail with reference to the drawings, wherein:

FIGS. 1a and 1b illustrate the principle on which a lining according to the invention operates;

FIG. 2 is a cross-section through a first embodiment of the lining according to the invention;

FIG. 3 is a view, taken along the line III—III in FIG. 4, of the lining surface; and FIG. 4 is a cross-section, taken along the line IV—IV in FIG. 3, through a second embodiment of the lining according to the invention.

The linings according to the invention use a property illustrated in FIGS. 1a and 1b.

Referring to FIG. 1a, a lining 1 comprising a metal wire 11 encased in a material 12 moves in the direction indicated by an arrow at high speed in relation to a metal frictional surface 2.

When the lining 1 is applied against the frictional surface 2, end 3 of the metal wire 11 skims the lining surface 2 and becomes welded thereto, but due to the relative movement between the lining and the frictional surface, the welded portion 3 is immediately sheared and the wire, which is still applied against the surface 2, becomes further welded to the surface 2 at a place 4 (FIG. 1b). The wire end therefore successively adheres to and is sheared off the surface 2, the shearing forces producing braking. The frequency of the successive adhesions depends on the composition of the lining, the speed of movement and the force with which the lining is applied against the frictional surface.

This event sometimes occurs in prior art linings, but the displacement of the lining in relation to the surface 2 as a rule pulls out the wire and then tears off the welded portion 3, causing rapid wear of the lining and the frictional surface, and the risk of jamming.

In contrast, in the linings according to the invention the shearing takes place very precisely in the welding plane. No metal is therefore torn off and wear and risk of jamming are greatly reduced. To this end a wire 11 is used which is formed by a metal which readily becomes welded to the frictional surface 2, the wire being enclosed by a material 12 which cannot become welded to the frictional surface 2. Conveniently, to facilitate shearing, the material is harder than the wire. The wire is therefore satisfactorily retained over its whole length as far as the plane of contact with the frictional surface 2 and the wire end 3, which is alone welded to the frictional surface 2, is sheared very precisely in such plane. The welded portion 3 is therefore of negligible thickness and wear is therefore much reduced.

These facts of course apply to small diameter wires, and therefore the lining is made from a number of usually sintered elements each formed by a nucleus composed of a weldable wire enclosed in a non-weldable material 12.

Clearly, the operation of the lining is not bound up with the internal constitution thereof, and all that is needed is for the outer surface applied against the frictional surface to have a number of lozenge-shaped areas which are adapted to become welded to the frictional surface and are satisfactorily retained by being enclosed in a non-weldable material. The same result can therefore be obtained in the embodiment shown in FIGS. 3 and 4.

In this instance the lining is formed by a plurality of sintered grains each formed by a metal nucleus 4 enclosed by a non-weldable layer 5. If a lining of this kind is sectioned, the sectional plane, for instance, III—III, will pass through a certain number of nuclei forming on the outer surface a plurality of lozenge-shaped areas 4 enclosed by the non-weldable material 5, as shown in FIG. 3.

FIG. 4 clearly shows that each lozenge-shaped area 4 enclosed by the non-weldable material 5 is satisfactorily retained over its whole periphery, so that shearing takes place precisely in the plane of the contact surface.

Although jamming risks are reduced in comparison with conventional linings, the lining according to the invention advantageously contains a certain quantity of graphite. To this end, the nuclei of a certain number of grains are composed not of a weldable material, but of graphite 6 enclosed by the same non-weldable material 5. The effect of the speed of movement on the frictional coefficient and therefore the rise in temperature of the lining is therefore reduced.

Since the grains are of small diameter, each sectional plane will pass through a certain number of metal nuclei ensuring braking.

During operation wear is substantially reduced, although it obviously takes place. The nuclei, as 41 (FIG. 4) therefore finally disappear when the contact surface gets to the position shown in chain-dot lines in FIG. 4, but such nuclei are progressively replaced by other nuclei, as 42. Since the grains are distributed at random and the nuclei are centred with a varying degree of irregularity inside the grains, the amount of lozenge-shaped areas uncovered, and therefore the efficiency of braking, will remain substantially constant.

When the lining has been produced by sintering, it can be sawn to reveal a certain number of weldable nuclei; the lining is then ready for immediate use. The lining can also be used after being removed from the mould. In that case the braking effect will appear only after a number of ineffective try-outs as a result of the crushing of the grains and the wearing of the enclosing material.

The substances from which the nuclei and the enclosing material are made are clearly selected in dependence on the nature of the frictional surface. More particularly, to enable the nuclei to become more readily welded to the frictional surface, they must have a crystalline structure whose basic lattice is compatible with that of the frictional surface. This is why the nuclei are made from a metal if necessary containing a small quantity of another metal in solid solution. For instance, since the frictional surface is generally made of steel, the nuclei will be made of an iron, nickel or copper alloy containing a small quantity of aluminium or tin in solid solution.

On the other hand, the enclosing material must be unable to become welded to the frictional surface, and its frictional coefficient must be very low. With a steel frictional surface, the enclosing material used will be an intermetallic compound whose atomic lattice is relatively complex and incompatible with that of steel. The frictional coefficient of the intermetallic compound will also be reduced by distributing a certain quantity of grains of graphite through the lining.

If the friction is extremely hard and causes considerable increases in temperature, the hardness of the intermetallic compound may have to be increased for its shearing function, its surface being coated to this end with a layer of oxide.

Similarly, to raise the permissible operating temperature of the lining, the intermetallic compound will be one having a high melting temperature. The following table provides by way of example a list of the intermetallic compounds which can be used, indicating their approximate melting temperature.

| Intermetallic compound: | Approximate melting temperature in ° C. |
| --- | --- |
| $FeAl_2$—$FeAl_3$ | 1160 |
| CuAl | 1645 |
| NiAl | 1640 |
| $Ni_3Sn$ | 1170 |
| $Ni_3Sn_2$ | 1264 |
| FeSn | 1130 |

The linings according to the invention can be produced by the conventional processes, more particularly by powder metallurgy processes.

By way of example, the following embodiment can be used:

Small balls are made having a nucleus of graphite or the adherent alloy, for instance almost pure nickel. Since the nuclei are made by any known process in the form of grains having a diameter of the order of 200μ, they are rotated in a rotary bowl and a mixture of extremely fine nickel powder and tin powder whose grains have a diameter of the order of 4μ is added slowly; at the same time a solution of collodion dissolved in acetone is poured in. At a suitable addition speed, the nuclei become coated with grains of metal, so that balls can be obtained which have a diameter slightly less than 2 mm. The balls are then heated in a reducing atmosphere, for instance, hydrogen, at about 600° C. The collodion is removed, and the tin melts, producing the intermetallic compound with the nickel. The nickel of the nucleus remains substantially unattacked by the tin, since homogenisation by diffusion takes place very quickly between small diameter grains, before the tin becomes deeply alloyed with the nucleus.

The resulting balls are substantially non-porous and can be externally oxidised by heating them in air at about 750° C.

The result of the process is balls whose nucleus is either graphite or the adherent alloy and which are subsequently coated with a layer of oxide. The balls with the graphite nucleus are then mixed with the balls whose nucleus is formed by a suitable proportion of adherent alloy, and the whole is compressed hot at about 800° C. in a graphite mould with a loading of the order of 100 bars in a neutral atmosphere, for instance, nitrogen.

The resulting garniture is substantially non-porous.

In this way linings were made whose total composition was as follows:

| | Percent |
| --- | --- |
| Nickel | 65 |
| Tin | 27 |
| Graphite | 6 |
| Oxygen | 2 |

In this composition, the relative proportions of the various components were as follows:

| | Percent |
| --- | --- |
| Nickel nucleus | 18 |
| Graphite nucleus | 6 |
| Enclosing intermetallic compound $Ni_3Sn$ | 67 |

Braking tests carried out on linings made in this way indicated that they showed practically no wear after 100 braking tests. In another test, simulating the conditions of stopping a rail vehicle, the brake was applied 20 times as the vehicle travelled 1800 metres at a speed of 220 km./h., whereafter the lining according to the invention showed practically no wear, since it can withstand a rise in temperature up to 700° C. without damage.

I claim:

1. A friction lining comprising sintered granular material, a portion of said granular material comprising grains each composed of a metal nucleus selected from the group consisting of iron, nickel and copper enclosed by a layer of an intermetallic compound harder than the nucleus.

2. A lining as set forth in claim 1, the nucleus containing in solid solution a small quantity of one of the metals selected from the group consisting of Al, Sn.

3. A lining as set forth in claim 1 wherein the intermetallic compound consists of a metal selected from the group consisting of Ni, Fe and a second metal selected from the group consisting of Al, Sn.

4. A lining as set forth in claim 3, the intermetallic compound being $Ni_3Sn$.

5. A lining as set forth in claim 1, the intermetallic compound enclosing the nucleus being coated with a surface layer of oxide formed by heating the particles in air at about 750° C.

6. A lining as set forth in claim 1, the melting point of the intermetallic compound being greater than 800° C.

7. A lining as set forth in claim 1, the lining comprising grains of a graphite nucleus covered by said intermetallic compound.

8. A lining as set forth in claim 1, said intermetallic compound being more than 50% by volume of the lining.

9. A friction lining comprising wires of a metallic material selected from the group consisting of iron, nickel and copper, said wires being enclosed by a layer of an intermetallic compound harder than the nucleus, said intermetallic layers being sintered together to form a matrix.

10. A lining as set forth in claim 1, the nucleus containing an alloy of a small quantity of one of the metals selected from the group consisting of Al and Sn.

References Cited

UNITED STATES PATENTS

| 3,191,734 | 6/1965 | Batchelor et al. | 29—182.5 |
| 3,540,862 | 11/1970 | Roemer | 29—182.5 |
| 3,074,152 | 1/1963 | Huntress | 29—182.5 |

CARL D. QUARFORTH, Primary Examiner

B. H. HUNT, Assistant Examiner

U.S. Cl. X.R.

29—182.7; 75—212; 106—36